Patented Dec. 30, 1941

2,268,215

UNITED STATES PATENT OFFICE 2,268,215

TREATMENT OF STARCH

Ralph Waldo Kerr, Riverside, Ill., assignor to Corn Products Refining Company, New York, N. Y., a corporation of New Jersey No Drawing. Application January 22, 1940, Serial No. 315,027

1 Claim. (Cl. 127—33)

This invention relates to the modification of starch, particularly corn (maize) starch, although the invention is not limited to this particular type of starch but may be employed for the treatment of starches generally.

The object of the invention is the production of a thin boiling starch, that is a starch which, when boiled with water, will form a paste which, while hot, is thinner than the paste produced from raw starches but which, when it cools will be thicker setting, that is, will form a gel having more firmness and body than ordinary thin boiling starches of the same degree of thinness as measured by hot paste viscosity, for example, thin boiling starches produced by the acid hydrolysis of the raw starch. By raw starch is intended, for example, starch produced by the ordinary commercial wet process method involving, as final steps, the washing of the starch twice on displacement filters, and the drying of the starch in drying kilns. Starch so produced will be in a very slight degree modified, due to the presence of the acid in the process; but for the purpose of comparison with the so-called thin boiling starches is to be regarded as a raw or "thick boiling" starch. It boils to a relatively thick, hot paste. It cools and sets to a relatively firm, thick gel.

The ordinary thin boiling starches produced by acid hydrolysis (and the same is true of starches modified by bacterial or enzymatic action or otherwise) give thin pastes, of various fluidities according to the mode of treatment, and are, generally speaking, correspondingly thin setting. The gels lack firmness and stability.

The starches modified according to the present invention give thin hot pastes, the degree of fluidity depending upon the method of treatment, but pastes which when cooled set to thicker, firmer and more stable gels than the ordinary thin boiling starches of corresponding fluidities. The fact is appreciated that modified starches may be made with varying degrees of cold paste viscosities by any system of conversion, some thinner, some thicker. The same is true in respect to the hot paste viscosities. However, if the functional relationship be determined between the ratio: cold paste body to hot paste viscosity and the degree of conversion for a particular starch, e. g. corn starch, modified by any system of conversion, e. g. sulphuric acid, diastase, halogens, per salts, sodium or hydrogen peroxide, and this ratio, viz.: cold paste viscosity, viz., Stormer index to hot paste viscosity, viz., Scott index, at any given degree of conversion be compared with the corresponding ratio for starch modified to the same extent by the process of the present invention, it will be found that the ratio is higher for the starch of the present invention in every case.

With a thin boiling starch in accordance with the present invention, a gel of the same body may be produced with less dry substance starch and more water, or a gel with more body by use of the same amount of starch than is possible with the ordinary thin boiling starches. For example, in the production of gum drops, in the candy industry, a compound has been made using the starch of the present invention and containing 22.4% of water which had more body than a compound made of the ordinary hydrolyzed thin boiling starch having a water content of only 20.8%. In the production of gum drops it is customary to use a high fluidity thin boiling starch, a thin boiling starch of, for example, 60 fluidity, so that the hot paste will be readily pourable and still contain a relatively high quantity of dry substance starch. The ordinary thin boiling starch of this fluidity, however, does not set to as thick and firm a gel as is desirable. In accordance with the present invention it is possible to produce a high fluidity, say 60 fluidity, thin boiling starch which will set to a much firmer, thicker and more stable gel when cooled.

*Scott tests for thin boiling starches.*—A usual test for determining the hot paste viscosity of thin boiling starches is known as the thin boiling Scott test (in distinction to the Scott test for thick boiling starches described in United States patent to Ralph Waldo Kerr, No. 2,108,862, February 22, 1938, page 1, right column, line 36), and is as follows: 28.35 grams of raw starch containing 12% moisture is mixed with 280 c. c. of distilled water and heated on a constant temperature bath at 100° C. for fifteen minutes and stirred for the first five minutes, for 10 seconds at the end of ten minutes and for 15 seconds at the end of 12¾ minutes. The mixture is then transferred to a cup, known as a Scott cup, heated to the temperature of the bath, provided with an overflow to limit the contents to 200 c. c. and provided with a discharge orifice which is immediately opened at the end of the fifteen minute period. The discharge orifice is of such size that when raw starch is modified to thin boiling starch, as above described, it will require, on the average of from 50 to 55 seconds for the first 100 c. c. of the paste to pass through the orifice. Such thin boiling starch has, therefore, a Scott index of 50-55. Thinner starches will have lower Scott indices and thicker starches higher Scott indices.

The term "fluidity," as used in this industry, is a function of the Scott index as expressed by the following equation:

$$\text{Fluidity} = \frac{2000}{\text{Scott}}$$

*Stormer test for thin boiling starches (starches having fluidities greater than 20).*—A cold starch gel is measured for viscosity by what is known as the Stormer test. This test is made by cooking 15 grams of the starch with 280 grams of water, cooling the paste to 77° F. and then determining the number of seconds that it requires for a cylinder weighing 55 grams, having a diameter of 31.75 mm. and a length of 34.93 mm. to make 50 revolutions within the paste when the cylinder is forced to rotate by a 50 gram weight.

The ordinary acid hydrolyzed thin boiling starches have low Scott indices and also low Stormer indices. For example, if a starch is modified, by the acid process to Scotts of 65, 50, 40 and 35, the corresponding Stormer indices will be in the neighborhood of 125, 60, 25 and 20, respectively; while the starch modified in accordance with the present invention to the same Scotts may have Stormer indices in the neighborhood of 560, 350, 120 and 60, respectively, all of these Stormers being considerably higher than the corresponding Stormers of acid treated thin boiling starches having the same hot paste viscosities measured by the Scott tests.

All of the above figures relate to corn starches.

To bring about the modification contemplated by the present invention, the starch is treated in water, and preferably with heat and stirring, with calcium peroxide or its equivalent, whereupon the starch liquor is neutralized with an acid capable of reacting with calcium peroxide to form a soluble salt removable from the starch by washing.

A suitable amount of calcium peroxide is between 6 and 8 grams to 1 liter of 20° Baumé starch liquor.

The converting or modifying temperature should be about 46°-52° C. (115°-125° F.) If the temperature is much above 52° C. the starch is likely to be gelatinized. If the temperature is much lower than 46° C., the process will be unnecessarily slow.

The time of treatment may vary from 24 to 48 hours, depending upon the temperature and upon the degree of thinning desired.

A suitable acid for neutralizing starch after modification is hydrochloric acid. Sulphuric acid could theoretically be used, but will form with the calcium peroxide and insoluble sulphate or gypsum which cannot be washed out of the starch. Preferably enough acid is used to bring the converted liquor to neutrality, pH=7.

The calcium peroxide is in solution and in an ionized state in the starch suspension. Apperently the peroxide radical acts as an oxidizing agent on the starch to give the starch its thin boiling characteristics, that is, low Scott. The peroxide radical also acts to produce certain specific but as yet unknown acidic residues in the starch molecule which are capable of combining with the calcium ion. The calcium metal ion then forms an additional compound with the acidic residues in the starch molecule, as has been demonstrated, and apparently it is this chemical combination between the metal and the starch which gives the modified starch its thick setting characteristics, namely its high Stormer index.

It is significant that the use of calcium hypochlorite will not produce a similar thin boiling starch with a high Stormer to low Scott ratio. The ratio will actually be less than that for an ordinary, acid-modified starch. The specific oxidizing effect of peroxide is therefore clearly indicated. In addition it is likewise significant that neither sodium nor hydrogen peroxide by themselves will produce thin boiling starches with high Stormer to low Scott ratios. Therefore, the specific nature of the combination of calcium with the peroxide oxidized starch is also evident.

From the foregoing it will be apparent that for equivalents of calcium peroxide other substances could be used which in solution give calcium ions and peroxide radicals.

For example, one may employ in place of calcium peroxide:

(1) Hydrogen peroxide and calcium hydroxide which, in solution, give by their reaction calcium peroxide and water.

(2) Calcium peroxide and hydrogen peroxide. The advantage here is economy by the use of less calcium peroxide, which is relatively expensive and, to compensate, a certain amount of hydrogen peroxide, which is less expensive than calcium peroxide.

(3) Calcium hydroxide, sodium peroxide, and hydrochloric acid; the latter in such limited amount that the reaction produces calcium peroxide, in an ionized state, that is, calcium ions and peroxide radicals, and water.

In fact, any compound or combinations of compounds may be used which, in solution, yield calcium ions and peroxide radicals.

It will be possible to use in place of calcium peroxide, or the equivalents noted above, any alkaline earth peroxide or substance or substances yielding in solution alkaline earth ions and peroxide radicals. However, barium and strontium compounds cannot be employed safely for treatment of starch to be used for food purposes because of their toxicity.

The following are specific examples of the reduction to practice of the invention.

It will be understood that the operating data given are typical and informative. The invention is not to be regarded as limited to these particulars. The intention is to cover all equivalents and all modifications within the scope of the appended claim.

*Example 1.*—Into 1 liter of 20° Baumé second filter starch is introduced 8 grams of calcium peroxide and the mixture heated to and maintained at 52° C., with stirring for 24 hours. The converted liquor, which will have a pH of about 11, is then neutralized to 7.0 pH with hydrochloric acid, and is de-watered by filtration and the filter cake re-suspended in water at 12° Baumé, filtered and washed to remove the soluble salt and dried.

The product will have a Scott of 53 and a Stormer of 550. These figures may vary somewhat depending upon the character of the starch used.

*Example 2.*—The process is the same as in Example 1 except that the converting agent consists of 6 grams of calcium peroxide and 5 grams of hydrogen peroxide.

*Example 3.*—The process is the same as in Example 1 except that the converted liquor is neutralized to a pH of about 8.5 with hydrochloric acid, de-watered, washed and dried as in Example 1. It is then further neutralized in the dry state to pH 7.0 by exposure of the starch to hydrogen chloride, acetic acid or other suitable volatilizable acid.

The advantage of this process is that it insures against a dissociation of the desired calcium-peroxide oxidized starch compound, since the calcium in the modified starch molecule is otherwise likely to be solubilized and washed out in the case of solutions of lower pH.

This product will have a Scott of 37 and a Stormer of 120.

This application is a continuation in part of applicant's application, Serial No. 230,200, filed September 16, 1938.

I claim:

Process of making starch thin boiling and thick setting which comprises: treating the starch in water with an amount of calcium peroxide in the proportion of 6–8 grams to 1 liter of 20° Baumé starch liquor, at a temperature between 46° and 52° C. (115°–125° F.) for from 24 to 48 hours; neutralizing the product with an acid capable of forming a soluble salt with the calcium; and washing out this salt.

RALPH WALDO KERR.